United States Patent
Okutsu et al.

(10) Patent No.: US 6,716,897 B2
(45) Date of Patent: Apr. 6, 2004

(54) COLORED COMPOSITION FOR COLOR FILTER AND COLOR FILTER

(75) Inventors: Satoshi Okutsu, Tokyo (JP); Kenichi Fujita, Tokyo (JP); Yukio Kodama, Tokyo (JP); Ichiro Toyoda, Tokyo (JP); Yuji Hirasawa, Tokyo (JP); Masashi Sawamura, Tokyo (JP)

(73) Assignee: Toyo Ink Mfg. Co., Ltd., Toyko (JP)

( * ) Notice: Subject to any disclaimer, the term of this patent is extended or adjusted under 35 U.S.C. 154(b) by 72 days.

(21) Appl. No.: 10/021,433

(22) Filed: Dec. 19, 2001

(65) Prior Publication Data

US 2002/0117080 A1 Aug. 29, 2002

(30) Foreign Application Priority Data

Dec. 22, 2000 (JP) ........................................ 2000-390822

(51) Int. Cl.⁷ ................................................. C08K 5/34
(52) U.S. Cl. ......................................... 524/88; 523/106
(58) Field of Search ............................ 524/88; 523/106

(56) References Cited

U.S. PATENT DOCUMENTS 5,708,049 A * 1/1998 Katagiri et al. ............. 523/106

\* cited by examiner

Primary Examiner—Kriellion A. Sanders
(74) Attorney, Agent, or Firm—Nixon & Vanderhye P.C.

(57) ABSTRACT

A colored composition for color filter contains a colorant carrier formed of a transparent resin, a precursor of a transparent resin or a mixture thereof, and a green colorant dispersed in the colorant carrier. The green colorant contains a first halogenated metallophthalocyanine pigment having copper as a central metal, and at least one second halogenated metallophthalocyanine pigment having, as a central metal, a metal selected from the group consisting of Mg, Al, Si, Ti, V, Mn, Fe, Co, Ni, Zn, Ge and Sn. The content of the second halogenated metallophthalocyanine pigment is within a range of 1 to 80 mol % based on a total amount of the green colorant. Also disclosed is a color filter including at least one red filter segment, at least one blue filter segment, and at least one green filter segment. At least one green filter segment is prepared from the above-mentioned colored composition.

8 Claims, No Drawings

COLORED COMPOSITION FOR COLOR FILTER AND COLOR FILTER

CROSS-REFERENCE TO RELATED APPLICATIONS

This application is based upon and claims the benefit of priority from the prior Japanese Patent Application No. 2000-390822, filed Dec. 22, 2000, the entire contents of which are incorporated herein by reference.

BACKGROUND OF THE INVENTION

1. Field of the Invention

The present invention relates to a colored composition for color filter used in a color liquid crystal display device or a solid state image sensor, and also to a color filter employing this colored composition.

2. Description of the Related Art

A color filter is generally provided, on the surface of a transparent substrate such as a glass substrate, with at least two fine stripe-shaped filter segments differing in hue from each other. These filter segments are disposed parallel or intersected with each other, or regularly arrayed vertically and horizontally. Each filter segment is fine in width, i.e., in the range of several micrometers to several hundreds micrometers, and is arrayed regularly for each hue.

On a color filter used in a color liquid crystal display device, transparent electrodes for actuating the liquid crystal are formed usually by means of vapor deposition or sputtering. Further, an alignment film for aligning the liquid crystal in a predetermined direction is formed over the transparent electrodes. In order to make the best use of the performances of these transparent electrodes and alignment film, the deposition of them is required to be performed at a high temperature of usually 200° C. or more, preferably 230° C. or more.

Therefore, the manufacture of the color filter is mainly performed at present by a method called a pigment dispersion method wherein pigments, which are excellent in light resistance and heat resistance, are employed as a colorant. Specifically, a color filter is now manufactured mainly by the following two methods.

According to a first method, a dispersion of pigment of a first color in a solution of a photosensitive transparent resin is coated on the surface of a transparent substrate such as a glass substrate. The coated layer is dried to remove the solvent, and then subjected to a patterning exposure, followed by a developing process to remove the unexposed portions, thus forming a pattern of the first color. Subsequently, a processing such as a heat treatment is applied to the first color pattern, if required. Thereafter, the procedures similar to those described above are repeated successively for all of the remaining filter colors. In this way, a desired color filter is produced.

According to a second method, a dispersion of pigment of a first color in a solution of transparent resin is coated on the surface of transparent substrate such as glass substrate. The coated layer is dried to remove the solvent. A resist such as a positive resist is coated on the surface of the coated layer, and subjected to a patterning exposure. Then, the resist layer is subjected to a developing process to form a resist pattern, which is used as an etching resist in the subsequent process wherein those portions of the coated layer which are not covered by the resist pattern are removed with an etching solution. Thereafter, the resist pattern is removed to form a pattern of the first color. Subsequently, a processing such as a heat treatment is applied to the first color pattern, if required. Thereafter, the procedures similar to those described above are repeated successively for all of the remaining filter colors. In this way, a desired color filter is produced. In this case, the developing of the resist and the etching of the coated layer may be performed simultaneously.

In the manufacture of green filter according to the aforementioned methods, a colored composition containing halogenated copper phthalocyanine green pigment has been conventionally employed. 16 halogen atoms can be introduced into the phthalocyanine ring, and C.I. Pigment Green 7, in which only chlorine atoms are introduced as halogen atoms into the copper phthalocyanine, C.I. Pigment Green 36, in which chlorine and bromine atoms are introduced into the copper phthalocyanine, are known. Generally, the higher the content of bromine introduced into copper phthalocyanine is, the higher the tendency that the visible light-transmitting wavelength region is shifted toward a longer wavelength side. The brightness (Y value) among three stimulus values of XYZ color specification system can be enhanced when the light-transmitting wavelength region is shifted toward a longer wavelength side as far as the green filter of color filter is concerned. Thus, C.I. Pigment Green 36 is generally employed for a green color filter.

However, there is a limitation in the quantity of bromine (i.e., at most 16 bromine atoms) that can be introduced into copper phthalocyanine pigment. Nonetheless, there is a strong demand for a green colored composition that can provide a green filter whose light-transmitting wavelength region is further shifted toward a longer wavelength side to further improving the brightness.

Therefore, an object of the present invention is to provide a colored composition for color filter, which is capable of providing a green filter exhibiting an improved brightness, and a color filter.

BRIEF SUMMARY OF THE INVENTION

The present inventors have made intensive studies in an attempt to achieve the aforementioned object. As a result, they have found that a combination of a halogenated copper phthalocyanine pigment and a halogenated metallophthalocyanine pigment having, as a central metal, a specified metal other than copper at a specified ratio can shift the light-transmitting wavelength region toward a longer wavelength side, thus making it possible to obtain a green filter exhibiting a further increased brightness.

Thus, the present invention provides a green colored composition for color filter, which comprises a colorant carrier comprising a transparent resin, a precursor of a transparent resin or a mixture thereof; and a green colorant dispersed in the colorant carrier and comprising at least one first halogenated metallophthalocyanine pigment having copper as a central metal, and at least one second halogenated metallophthalocyanine pigment having, as a central metal, a metal selected from the group consisting of Mg, Al, Si, Ti, V, Mn, Fe, Co, Ni, Zn, Ge and Sn; wherein the content of the second halogenated metallophthalocyanine pigment is within a range of 1 to 80 mol % based on a total amount of the green colorant.

In the colored composition of the present invention, the first halogenated metallophthalocyanine pigment preferably contains 8 to 16 bromine atoms per molecule thereof.

Further, in the colored composition of the present invention, the second halogenated metallophthalocyanine pigment preferably contains 8 to 16 bromine atoms per molecule thereof.

According to a second aspect of the invention, there is provided a color filter comprising at least one red filter segment, at least one blue filter segment, and at least one green filter segment, wherein at least one green filter segment is prepared from a colored composition of the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

The colored composition according to the present invention contains a colorant carrier formed of a transparent resin, a precursor of a transparent resin or a mixture thereof, and a green colorant dispersed in the colorant carrier. The green colorant comprises a first halogenated metallophthalocyanine pigment having copper as a central metal, and a second halogenated metallophthalocyanine pigment having, as a central metal, a specified metal other than copper. The colorant carrier provides a resinous binder in a finished green filter segments.

Specific examples of the first halogenated metallophthalocyanine pigment, i.e., halogenated copper phthalocyanine pigment, employed in the present invention include C.I. Pigment Green 7 wherein only chlorine atoms are introduced therein as halogen atoms, and C.I. Pigment Green 36 wherein chlorine and bromine atoms are introduced therein as halogen atoms.

Among them, a halogenated copper phthalocyanine pigment incorporating bromine therein, e.g., C.I. Pigment Green 36 can be preferably employed, since the transmitting wavelength region is shifted to a longer wavelength side. Further, in order to enable the transmitting wavelength region of halogenated copper phthalocyanine pigment to be shifted to a longer wavelength side, the halogenated copper phthalocyanine pigment preferably contains 8 to 16 bromine atoms, more preferably 12 to 16 bromine atoms, per molecule, on average.

The second halogenated metallophthalocyanine pigment constituting the green pigment together with the halogenated copper phthalocyanine pigment functions to shift the transmitting wavelength region of green filter segment toward a further longer wavelength side. The central metal of the second halogenated metallophthalocyanine pigment is at least one metal (hereinafter referred to as specified dissimilar metal) selected from the group consisting of Mg, Al, Si, Ti, V, Mn, Fe, Co, Ni, Zn, Ge and Sn. These second halogenated metallophthalocyanine pigments may be used in combination wherein the central metals differ from each other. Where the central metal is constituted by a trivalent or tetravalent metal such as Al, Si, Ti, V, Mn, Fe, Ge or Sn, an axial substituent(s) or axial ligand(s) may exist. Specific examples of such axial substituents include, but not limited thereto, a halogen such as —F, —Cl, —Br or —I, alkoxyl group; phenoxy group, and =O.

In the present invention, the second halogenated metallophthalocyanine pigment is present in an amount of 1 to 80 mol %, preferably 5 to 60 mol %, more preferably 9 to 45 mol % based on the total amount of the green colorant (the first halogenated metallophthalocyanine pigment (i.e. halogenated copper phthalocyanine pigment)+the second halogenated metallophthalocyanine pigment). If an amount of the second halogenated metallophthalocyanine pigment is less than 1 mol %, the transmitting wavelength region is difficult to shift to a longer wavelength side. On the other hand, if an amount of the second halogenated metallophthalocyanine pigment exceeds 80 mol %, the concentration of green color would become lower, thus deteriorating the chromaticity of green color, and is unsuited for use in the present invention, though the transmitting wavelength region is shifted to a longer wavelength side.

The green colorant employed in the present invention can be produced, for example, by a method wherein a crude metallophthalocyanine pigment having the specified dissimilar metal as a central metal is halogenated by a known method to obtain a halogenated pigment, which is mixed with a crude halogenated copper phthalocyanine pigment. Alternatively, the green colorant can be prepared by a method wherein a crude copper phthalocyanine pigment is halogenated in the presence of a specified dissimilar metal compound to synthesize a crude halogenated (copper/specified dissimilar metal) phthalocyanine pigment in which a part of coppers is replaced by the specified dissimilar metal. Also, the green colorant can be prepared by a method wherein part of coppers of the crude halogenated copper phthalocyanine pigment is replaced by the specified dissimilar metal.

Since the crude halogenated (copper/specified dissimilar metal) phthalocyanine pigment obtained according to the aforementioned methods is nearly amorphous in particle configuration, it would be difficult to disperse in the carrier. Therefore, the crude pigment should preferably be allowed to be crystal-grown by means of a conventional method. The crystal growth can be effected by a method wherein the above amorphous crude halogenated (copper/specified dissimilar metal) phthalocyanine pigment is dispersed in an organic solvent and then heated, or by a method wherein the phthalocyanine pigment is heated while imparting a mechanical shear to the phthalocyanine pigment (hereinafter, these methods are referred to as pigmentization process).

More specifically, one example of the former pigmentization processes involves mixing an amorphous crude halogenated (copper/specified dissimilar metal) phthalocyanine pigment with about 5 to 30 times weight of xylene, and growing crystals by heating the mixture under the reflux of xylene while stirring. On the other hand, one example of the latter pigmentization processes is a called salt milling process wherein a mixture of an amorphous crude halogenated (copper/specified dissimilar metal) phthalocyanine pigment, a water-soluble inorganic salt and a small amount of a water-soluble organic solvent is kneaded using a kneader while heating the mixture, thereby enabling the crystal growth of the pigment to proceed. However, care should preferably be taken not to grow crystals excessively largely, since the color filter is required to be excellent in transparency. The average particle diameter of the primary particles of the pigment crystal obtained should preferably be not more than 0.1 μm, more preferably not more than 0.05 μm.

As a solvent used in the pigmentization processes, use may be made of, other than xylene as mentioned above, a hydrocarbon solvent such as toluene, ethyl benzene, diethyl benzene, methyl cyclohexane or ethyl cyclohexane; a halogenated hydrocarbon solvent such as trichloroethane, tetrachloroethane, trichloropropane, monochlorobenzene, dichlorobenzene, trichlorobenzene or chlorotoluene; an alcoholic solvent such as butanol, isopentanol, hexanol, 2-ethyl-1-hexanol, benzyl alcohol, cyclohexanol, ethylene glycol or propylene glycol; a phenolic solvent such as phenol or cresol; an ether solvent such as dibutyl ether, anisole, dioxane, ethylene glycol diethyl ether or ethylene glycol dibutyl ether; a ketone solvent such as butyl methyl ketone, isobutyl ketone, cyclohexanone, methylcyclohexanone or acetophenone; an ester solvent such as propyl acetate, butyl acetate, isobutyl acetate, isopentyl acetate, 3-methoxybutyl acetate, 2-ethylbutyl acetate, 2-ethylhexyl acetate, butyl propionate, ethyl benzoate, diethyl maleate or ethylene glycol monoacetate; nitrobenzene; N-methyl aniline; pyperidine; pyridine; N,N-dimethylformamide; N-methyl-2-pyrrolidone; ethyl cellosolve; butyl cellosolve; ethyl carbitol. These solvents can be employed singly or in combination. Further, it is possible to employ an emulsion in which a water-insoluble solvent is emulsified or dispersed in water using a surfactant.

The salt milling process mentioned above is a pigmentization process wherein a crude pigment, a water-soluble inorganic salt and a water-soluble organic solvent are mixed together and kneaded under heating, followed by removing the inorganic salt and a high-boiling point solvent by washing with water. The water-soluble inorganic salt functions as a grinding aid, and by taking advantage of the high hardness of the inorganic salt, the crude pigment is pulverized. It is thought that the pulverization causes the generation of active surfaces, which give rise to the crystal growth of the pigment. Therefore, the grinding and crystal growth of the crude pigment occur concurrently during kneading, and the primary particle diameter of the pigment varies depending on the conditions of the kneading step. When the pigmentization process is performed through the salt milling, the crystal growth should be promoted by the heating of the crude pigment. The heating temperature is preferably 70 to 150° C. If a heating temperature is less than 70° C., the crystal growth would become insufficient, so that the configuration of the particles of pigment would become nearly amorphous, which is undesirable. On the other hand, if a heating temperature exceeds 150° C., the crystal growth would become excessive, thus excessively enlarging the primary particle diameter of the pigment, which is not suitable as a colorant for a colored composition for color filter.

The water-soluble inorganic salt employed in the salt milling process includes sodium chloride, barium chloride, potassium chloride and sodium sulfate. Among them, the employment of sodium chloride is preferable in terms of cost. The quantity of the inorganic salt employed in the salt milling should preferably be 0.5 to 20 times weight, more preferably 1 to 10 times weight as much as that of the crude pigment, in view of the treatment efficiency and of productivity efficiency.

The water-soluble organic solvent serves to wet the crude pigment and the water-soluble inorganic salt. Use may be made of any water-soluble organic solvent, which can be dissolved in (or miscible with) water and which does not substantially dissolve the inorganic salt used. However, during the salt milling process, the temperature is increased to provide a condition under which a solvent is ready to evaporate. Thus, the solvent used preferably have a boiling point of as high as not less than 120° C. in view of safety. Specific examples of such water-soluble organic solvent include, for example, 2-methoxy ethanol, 2-butoxy ethanol, 2-(isopentyloxy)ethanol, 2-(hexyloxy)ethanol, diethylene glycol, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether and liquid polypropylene glycol.

In order to prevent the pigment obtained through the pigmentization process from being agglomerated during the drying process of the pigment, a resin may be co-used so as to enable the pigment to be easily dispersed in the transparent resin. When a resin is co-used during salt milling process, a soft powdery pigment can be obtained. A resin used in the salt milling process is preferably one that is solid at room temperature, water-insoluble and soluble at least partially in the aforementioned organic solvent. Such a resin includes a natural resin, a modified natural resin, a synthetic resin and a synthetic resin modified with a natural resin. One typical example of the natural resin is rosin. The modified natural resin includes a rosin derivative, a cellulose derivative, a rubber derivative, a protein derivative, and an oligomer thereof. The synthetic resin includes an epoxy resin, an acrylic resin, a maleic resin, a butyral resin, a polyester resin, a melamine resin, a phenolic resin, a polyurethane resin, and a polyamide resin. The synthetic resin modified with a natural resin includes a rosin-modified maleic resin, and a rosin-modified phenolic resin. The resin can be preferably employed at a ratio ranging from 5 to 100% by weight based on the crude pigment used.

In addition to the aforementioned resin, it is also possible, in the salt milling process, to add an additive such as a dispersing agent or a plasticizer; or an inorganic pigment which is generally known as an extender pigment such as calcium carbonate, barium sulfate or silica. It is also possible to add, in the salt milling process, other kinds of pigment in order to adjust the resultant hue.

The colorant carrier for dispersing the green colorant of the present invention can be constituted as mentioned above by a transparent resin, a precursor of a transparent resin, or a mixture thereof. The transparent resin preferably exhibits a light transmittance of not less than 80%, more preferably not less than 95% in the entire wavelength region of the visible light region ranging from 400 to 700 nm in wavelength. The transparent resin may be a thermoplastic resin, a thermosetting resin or a photosensitive resin. The precursor of the transparent resin includes a monomer or oligomer which is capable of producing a transparent resin when cured by the irradiation of radiation. These transparent resin and precursor may be employed singly or in combination of two or more of them.

If the green colored composition according to the present invention is cured by the irradiation of ultraviolet rays, a photo-initiator is added to the composition.

The transparent thermoplastic resin includes a butyral resin, a styrene-maleic acid copolymer, a chlorinated polyethylene, a chlorinated polypropylene, a polyvinyl chloride, a vinyl chloride-vinyl acetate copolymer, a polyvinyl acetate, a polyurethane resin, a phenol resin, a polyester resin, an acrylic resin, an alkyd resin, a styrene resin, a polyamide resin, a rubber-based resin, a cyclized rubber, a cellulose, a polybutadiene, and a polyimde resin. Further, the thermosetting resin includes an epoxy resin, a benzoguanamine resin, a melamine resin, and a urea resin.

The photo-sensitive resin includes reaction products of linear polymers having a reactive substituent group such as hydroxyl group, carboxyl group and/or amino group with a compound, e.g., (meth)acrylic compound or cinnamic acid having a reactive substituent such as isocyanate group, aldehyde group and/or epoxy group to introduce a photocrosslinkable group such as (meth)acryloyl group and/or styril group in the linear polymers. It is also possible to employ, as a photo-sensitive resin, a half-esterified product of a linear polymer containing an acid anhydride such as styrene-maleic anhydride copolymer or α-olefin-maleic anhydride copolymer with a (meth)acrylic compound having hydroxyl group such as hydroxyalkyl (meth)acrylate.

The monomer and oligomer include acrylic esters and methacrylic esters such as 2-hydroxyethyl(meth)acrylate, 2-hydroxypropyl (meth)acrylate, cyclohexyl (meth)acrylate, polyethylene glycol di(meth)acrylate, pentaerythritol tri (meth)acrylate, dipentaerythritol hexa(meth)acrylate, tricyclodecanyl (meth)acrylate, melamine (meth)acrylate, epoxy (meth)acrylate, etc.; (meth)acrylic acid; styrene; vinyl acetate; (meth)acryl amide; N-hydroxymethyl (meth)acryl amide; and acrylonirile.

Specific examples of the photo-initiator include acetophenone-based photo-initiators such as 4-phenoxydichloroacetophenone, 4-t-butyl-dichloroacetophenone, diethoxyacetophenone, 1-(4-isopropylphenyl)-2-hydroxy-2-methylpropan-1-one, 1-hydroxycyclohexylphenyl ketone, 2-benzyl-2-dimethylamino-1-(4-morpholinophenyl)-butan-1-one, etc.; benzoin-based photo-initiators such as benzoin, benzoinmethyl ether, benzoinethyl ether, benzoinisopropyl ether, benzyldimethyl ketal, etc.; benzophenone-based photo-initiators such as benzophenone, benzoyl benzoic acid, methyl benzoylbenzoate, 4-phenyl benzophenone, hydroxybenzophenone, acrylic benzophenone, 4-benzoyl-4'-methyldiphenyl sulfide, etc.; thioxanthone-based photo-initiators such as thioxanthone, 2-chlorothioxanthone, 2-methylthioxanthone, isopropylthioxanthone, 2,4-diisopropylthioxanthone, etc.; triazine-based photo-initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naptha-1-yl)-4,6-bis(trichloromethyl)-s-triazine, 2,4-trichloromethyl-(piperonyl)-6-triazine, 2,4-trichloromethyl-(4'-methoxystyryl)-6-triazine, etc.; borate-based photo-initiators; carbazole-based photo-initiators; and imidazole-based photo-initiators.

The aforementioned photo-initiators can be employed singly or in combination of two or more kinds, and may be also used together with a sensitizer such as α-acyloxim ester, acylphosphine oxide, methylphenyl glyoxylate, benzyl, 9,10-phenanthrene quinone, camphor quinone, ethylanthraquinone, 4,4'-diethylisophthalophenone, 3,3',4,4'-tetra(t-butyl peroxycarbonyl)benzophenone, and 4,4'-diethyl aminobenzophenone.

The colored composition according to the present invention can be manufactured by a process wherein a green colorant consisting of a halogenated copper phthalocyanine pigment and a second halogenated metallophthalocyanine pigment are finely dispersed, if required, together with any of the aforementioned photo-initiators, in a colorant carrier by using various dispersing means such as a triple roll mill, a dual roll mill, a sand mill or a kneader. Alternatively, the colored composition according to the present invention can be manufactured by a process wherein a halogenated copper phthalocyanine pigment and a second halogenated metallophthalocyanine pigment are separately dispersed in a colorant carrier, and then, both of the resultant dispersions are mixed together at a ratio which makes the content of the second halogenated metallophthalocyanine pigment become the aforementioned predetermined ratio.

In dispersing the pigment in a colorant carrier, it is possible to optionally employ a dispersing aid such as a resin-type pigment dispersant, a surfactant or a dyestuff derivative or pigment derivative. Since this dispersing aid is very useful for dispersing a pigment as well as for preventing the pigment thus dispersed from being reaggregated, if this dispersing agent is employed in dispersing a pigment in a colorant carrier, it would become possible to obtain a color filter which is excellent in transparency.

The resin-type pigment dispersant has a pigment affinity moiety which is adsorbable onto a pigment, and a moiety which is compatible with a colorant carrier, and functions to stably disperse the pigment in the colorant carrier by being adsorbed on the pigment. Specific examples of the resin-type pigment dispersant include a polyurethane, a polycarboxylate such as polyacrylate, an unsaturated polyamide, a polycarboxylic acid, a (partial) amine salt of a polycarboxylic acid, an ammonium salt of a polycarboxylic acid, an alkylamine salt of a polycarboxylic acid, a polysiloxane, a long chain polyaminoamide phosphate, a hydroxyl-containing polycarbonate, modified materials thereof, an oil dispersant such as an amide which can be formed through a reaction between a poly(lower alkylene imine) and a polyester having a free carboxyl group or salts of the amide, a water-soluble resin or water soluble polymer such as a (meth)acrylic acid-styrene copolymer, a (meth)acrylic acid-(meth)acrylate copolymer, a styrene-maleic acid copolymer, a polyvinyl alcohol or a poly(vinyl pyrrolidone); a polyester, a modified polyacrylate, an ethylene oxide/propylene oxide addition compound, and phosphate. These compounds can be employed singly or in combination of two or more kinds.

The surfactant includes anionic surfactants such as sodium lauryl sulfate, polyoxyethylene alkylether sulfate, sodium dodecylbenzene sulfonate, alkali salt of styrene-acrylic acid copolymer, sodium stearate, sodium alkylnaphthalene sulfonate, sodium alkyldiphenyl ether disulfonate, monoethanol amine lauryl sulfate, triethanol amine lauryl sulfate, ammonium lauryl sulfate, monoethanol amine stearate, monoethanol amine of styrene-acrylic acid copolymer, polyoxyethylene alkylether phosphate; nonionic surfactants such as polyoxyethylene oleyl ether, polyoxyethylene lauryl ether, polyoxyethylene nonylphenyl ether, polyoxyethylene alkylether phosphate, polyoxyethylene sorbitan monostearate, polyethylene glycol monolaurate, etc.; cationic surfactants such as alkyl quaternary ammonium salt or ethylene oxide addition compounds thereof, etc.; and amphoteric surfactants such as alkyl betaine such as betaine alkyldimethyl aminoacetate, and alkyl imidazoline. These compounds can be employed singly or in combination of two or more kinds.

The dyestuff or pigment derivative is a compound consisting of an organic dyestuff into which a substituent group is introduced. The dyestuff or pigment derivative to be employed in the present invention should preferably be green or yellow in color in view of the hue of colored composition. However, if the quantity required to be added is minimal, a dyestuff derivative having blue color may be employed. The dyestuff or pigment is defined herein to include a light yellow aromatic polycyclic compound such as naphthalene-based or anthraquinone-based compounds which are not called dyestuff in general. As for this dyestuff or pigment derivative, it is possible to employ those described in Jpn. Pat. Appln. KOKAI Publication No. 63-305173; Jpn. Pat. Appln. KOKOKU Publication No. 57-15620; Jpn. Pat. Appln. KOKOKU Publication No.

59-40172; Jpn. Pat. Appln. KOKOKU Publication No. 63-17102; and Jpn. Pat. Appln. KOKOKU Publication No. 5-9469. These dyestuff or pigment derivatives can be employed singly or in combination of two or more kinds.

The colored composition according to the present invention preferably contains a yellow pigment in order to realize a spectrum which is required for a green filter. Although there is not any particular limitation on this yellow pigment, it is preferably selected from pigments which meet the spectrum required and are excellent in various resistance properties. Specific examples thereof include C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 126, 127, 128, 129, 138, 139, 150, 151, 152, 153, 154, 155, 156, 161, 162, 164, 166, 168, 169, 170, 171, 172, 173, 174, 175, 176, 177, 179, 180, 181, 182, 185, 187, 199, etc.

These compounds can be employed singly or in combination of two or more kinds. The yellow pigment can be singly dispersed in a colorant carrier so as to prepare a yellow color composition, can be mixed with a green color composition wherein the aforementioned green colorant is dispersed in a colorant carrier, or can be mixed with the aforementioned green colorant and dispersed in a colorant carrier.

The colored composition for color filter according to the present invention may contain a solvent for enabling a pigment to be sufficiently dispersed in a colorant carrier, thereby permitting the colored composition to be easily coated on a transparent substrate such as a glass substrate so as to form a green filter segment having a dry film thickness of 0.2 to 5 $\mu$m. Specific examples of the solvent useful in this case include cyclohexanone, ethyl Cellosolve acetate, butyl Cellosolve acetate, 1-methoxy-2-propyl acetate, diethyleneglycol dimethyl ether, ethyl benzene, ethyleneglycol diethyl ether, xylene, ethyl Cellosolve, methyl-n-amyl ketone, propyleneglycol monomethylether, toluene, methylethyl ketone, ethyl acetate, methanol, ethanol, isopropyl alcohol, butanol, isobutyl ketone, petroleum-based solvents, etc. These solvents may be employed singly or in combination thereof.

The colored composition for color filter according to the present invention may contain a storage stabilizer for stabilizing the time viscosity of the composition. Specific examples of such a storage stabilizer include benzyltrimethyl chloride, a quaternary ammonium chloride such as diethylhydroxy amine; an organic acid such as lactic acid, oxalic acid and a methyl ether thereof; t-butylpyrocatechol; an organic phosphine such as tetraethyl phosphine or tetraphenyl phosphine; phosphite; etc.

The colored composition for color filter according to the present invention can be formulated as a printing ink for gravure offset, a printing ink for water-less offset, a printing ink for silk screen printing, or a solvent development type or alkali development type coloring resist material. The coloring resist material can be manufactured by dispersing the green colorant of the present invention in a composition comprising a monomer, a photo-initiator, and a resin selected from the group consisting of a thermoplastic resin, a thermosetting resin and a photo-sensitive resin.

The green colorant of the present invention and the yellow pigment employed as required can be incorporated in the colored composition of the present invention in an amount of 1.5 to 7% by weight in total (green colorant+yellow pigment) if the green filter segment is formed by means of photolithography, or in an amount of 1.5 to 55% by weight in total (green colorant+yellow pigment) if the green filter segment is formed by means of printing method. In any case, the pigments (green colorant+yellow pigment) can be incorporated in the final green filter segment in an amount of preferably 10 to 55% by weight, more preferably 20 to 50% by weight (the balance of the colored composition being constituted substantially by a resinous binder provided by a colorant carrier). The weight ratio between the green colorant and the yellow pigment is preferably 1:1 to 2.5:1. Accordingly, the amount of the green colorant contained in the final green filter segment is preferably 5% by weight to 39% by weight.

The green colored composition according to the present invention is preferably subjected to a centrifugal separation or a filtering using a sintered filter or a membrane filter before use so as to remove coarse particles having a particle diameter of 5 $\mu$m or more, more preferably 1 $\mu$m or more, most preferably 0.5 $\mu$m or more and the dusts that have been intermingled therein.

As already described above, the color filter according to the present invention comprises at least one red filter segment, at least one blue filter segment, and at least one green filter segment. In this case, the green filter segment is formed using a colored composition of the present invention. The red filter segment and the blue filter segment can be formed by making use of an ordinary red color composition and an ordinary blue color composition, respectively.

The red colored composition may be a composition that can be obtained by substituting a red pigment for the green colorant in the colored composition of the present invention. Specific examples of the red pigment include C.I. Pigment Red 7, 14, 41, 48:1, 48:2, 48:3, 48:4, 146, 177, 178, 184, 185, 187, 200, 202, 208, 210, 246, 254, 255, 264, 272, etc.

The blue colored composition may a composition that can be obtained by substituting a blue pigment for the green colorant in the colored composition of the present invention and by making use of a violet pigment or the aforementioned yellow pigments as a toning colorant if required, the blue pigment being selected for example from C.I. Pigment Blue 15, 15:1, 15:2, 15:3, 15:4, 15:6, 16, 60, etc., and the violet pigment being selected for example from C.I. Pigment Violet 19, 23, 27, 32, 42, etc.

The color filter according to the present invention can be manufactured by forming each filter segment on a transparent substrate using the colored compositions including the colored composition of the present invention by means of a printing method or a photolithography.

As the transparent substrate, it is possible to employ a glass substrate or a plastic substrate formed of a resin such as a polycarbonate, a polymethylmethacrylate or a polyethylene terephthalate.

The formation of each color filter segment by means of a printing method is advantageous in that since the patterning of the filter segment can be achieved by simply repeating the printing and drying processes of a colored composition prepared as a printing ink for each color, the color filter can be manufactured at low cost and with excellent mass-productivity. Additionally, owing to the development of printing technique in recent years, it is now possible to perform a printing of fine pattern which is excellent in dimensional precision and also in flatness.

For the purpose of printing, the ink composition should preferably be formulated such that the ink can be hardly dried or cured on the form plate or on the blanket. Further, the controlling of the fluidity of ink on the printing machine is also important. In this regard, the adjustment of viscosity of ink can be performed by making use of a dispersant or an extender pigment.

If each color filter segment is to be formed by means of a photolithography, a colored composition which has been formulated into a solvent development type or alkali development type coloring resist material is coated on a transparent substrate to a thickness of 0.2 to 5 $\mu$m (dry thickness) by means of coating method such as spray coating, spin coating, slit coating or roll coating to form a film. After being dried if required, the film is exposed to ultraviolet ray through a mask having a predetermined pattern and disposed in contact with or non-contacted with the film. Thereafter, the film is dipped in a solvent or an alkaline developing solution or sprayed with a solvent or a developing solution so as to remove the unexposed portion or uncured portion of the film, thereby forming a desired pattern. The same procedures are repeated for the formation of pattern of other colors, thereby manufacturing the color filter. In these procedures, heating may be applied thereto for the purpose of promoting the polymerization of the coloring resist material. According to this photolithography, it is possible to manufacture a color filter which is more excellent in precision than that to be obtained by means of the aforementioned printing method.

An aqueous solution of sodium carbonate or sodium hydroxide may be employed as an alkaline developing solution on the occasion of development. It is also possible to employ an organic alkali such as dimethylbenzylamine, triethanolamine, etc. on the occasion of development. It is also possible to incorporate an antifoaming agent or a surfactant into the developing solution.

After the coating and drying of the coloring resist material, a film which is capable of preventing oxygen-induced polymerization inhibition for the purpose of improving the sensitivity of the film to ultraviolet ray may be deposited thereon by the coating and drying of a water-soluble or alkali-soluble resin such as polyvinyl alcohol or a water-soluble acrylic resin before the irradiation with ultraviolet ray.

The color filter of the present invention can be manufactured also by means of electrodeposition method or transferring method other than the aforementioned methods. In this regard, the colored composition of the present invention is also applicable to any of these methods. By the way, the electrodeposition method is a method wherein each color filter segment is electrodeposited on the surface of a transparent electroconductive film through the electrophoresis of colloid particles by taking advantage of the transparent electroconductive film formed in advance on the transparent substrate. Whereas, the transferring method is a method wherein a color filter layer is formed in advance on the surface of releasable transferring base sheet, and then, this color filter layer is transferred onto a desired transparent substrate.

Next, the present invention will be further explained with reference to the following examples, which are not intended to limit the scope of the present invention. In the Examples given below, all "part(s)" are by weight, and all "%" means "mol %".

First of all, the acrylic resin solution, the crude green pigment and the green pigment which were employed in the following examples and comparative examples will be explained.

<Preparation of an Acrylic Resin Solution>

800 parts of cyclohexanone were introduced into a reaction vessel and heated at a temperature of 100° C. while injecting nitrogen gas into the reaction vessel, and a mixture consisting of the monomers described below and a thermal polymerization initiator was added dropwise over one hour at a temperature of 100° C., thereby performing the polymerization reaction thereof.

| | |
|---|---|
| Styrene | 60.0 parts |
| Methacrylic acid | 60.0 parts |
| Methyl methacrylate | 65.0 parts |
| Butyl methacrylate | 65.0 parts |
| Azobisisobutyronitrile | 10.0 parts |

Upon finishing the dropwise addition of the mixture, the mixture was allowed to further react for 3 hours. Then, 2.0 parts of azobisisobutyronitrile dissolved in 50 parts of cyclohexanone were added to the reaction mixture, and the resultant mixture was allowed to proceed the reaction thereof at a temperature of 100° C. for one hour to obtain a solution of acrylic resin having a weight average molecular weight of about 40000.

After being cooled down to room temperature, about 2 g of the resin solution thus obtained was sampled and heat-dried for 20 minutes at a temperature of 180° C. to thereby measure the nonvolatile matter thereof. Based on this measurement, cyclohexanone was added to the solution of acrylic resin that had been synthesized previously so as to prepare a solution of acrylic resin containing 20% by weight of the nonvolatile matter.

Next, the method of synthesizing the crude green pigment will be described. By the way, the measurement of metals in the crude pigment synthesized was performed as follows. First, 0.5 g of crude pigment, 1 mL of sulfuric acid and 3 mL of nitric acid were placed in a 100 mL beaker, and heated for one and half hours over a gas stove to decompose the crude pigment, which was followed by another heating treatment in an electric furnace heated to a temperature of 600° C. for 4 hours to further decompose the crude pigment. 5 mL of hydrochloric acid and 25 mL of pure water were added to the resultant decomposition product to dissolve the decomposition product. The resultant dissolved matter was formulated into a 50 mL solution, which was then subjected to ICP atomic emission spectrometry to measure the atomic weight of metals. The number of chlorine atom and of bromine atom in the crude pigment (an average number of chlorine atom and of bromine atom in one molecule) was measured by a method wherein 0.01 g of the crude pigment was wrapped in a sheet of No. 6 filter paper, and 5 drops of hydrogen peroxide was added dropwise onto this filter paper to obtain a test sample, which was then burned in a combustion flask purged with oxygen gas to obtain a residue product, which was formulated into a 100 mL solution and subjected to ion chromatography to measure the number of chlorine atom and of bromine atom.

<Crude Green Pigment 1>

64 parts of copper phthalocyanine and 5 parts of aluminum phthalocyanine were dissolved in a fused salt mixture which was heated in advance to 140° C., the fused salt mixture comprising 429 parts of aluminum chloride and 96 parts of sodium chloride, thereby obtaining a mixture, which was then stirred for 2 hours while maintaining the aforementioned temperature. Then, the reaction temperature of the mixture was increased to 180° C., and bromine was added dropwise in the reaction mixture at a rate of 48 parts per hour over 5 hours. Subsequently, chlorine was introduced in the reaction mixture at a rate of 30 parts per hour over 2 hours. The resultant reaction solution was slowly poured into 4000 parts of water and then, subjected to filtration and water-washing to obtain 197.2 parts of crude green pigment 1. The crude green pigment 1 thus obtained was found to consist of 90.5% of crude halogenated copper phthalocyanine pigment and 9.5% of crude halogenated aluminum phthalocyanine pigment, wherein the crude halogenated copper phthalocyanine pigment contained in its each molecule bromine atom and chlorine atom in average number of 13.5 and 2.5, respectively, whereas the crude halogenated aluminum phthalocyanine pigment contained in its each molecule bromine atom and chlorine atom in average number of 13.5 and 2.5, respectively.

<Crude Green Pigment 2>

69 parts of copper phthalocyanine were dissolved in a fused salt mixture which was heated in advance to 160° C., the fused salt mixture comprising 429 parts of aluminum chloride and 96 parts of sodium chloride, thereby obtaining a mixture, which was then stirred for 2 hours at an increased temperature 200° C. Then, the reaction temperature of the mixture was lowered down to 180° C., and bromine was added dropwise in the reaction mixture at a rate of 48 parts per hour over 5 hours. Subsequently, chlorine was introduced in the reaction mixture at a rate of 30 parts per hour over 2 hours. The resultant reaction solution was slowly poured into 4000 parts of water and then, subjected to filtration and water-washing to obtain 196.6 parts of crude green pigment 2. The crude green pigment 2 thus obtained was found to consist of 58.0% of crude halogenated copper phthalocyanine pigment and 42.0% of crude halogenated aluminum phthalocyanine pigment, wherein the crude halogenated copper phthalocyanine pigment contained in its each molecule bromine atom and chlorine atom in average number of 13.5 and 2.5, respectively, whereas the crude halogenated aluminum phthalocyanine pigment contained in its each molecule bromine atom and chlorine atom in average number of 13.5 and 2.5, respectively.

<Crude Green Pigment 3>

65 parts of aluminum phthalocyanine were dissolved in a fused salt mixture which was heated in advance to 140° C., the fused salt mixture comprising 429 parts of aluminum chloride and 96 parts of sodium chloride, thereby obtaining a mixture, which was then stirred for 2 hours while maintaining the aforementioned temperature. Then, the reaction temperature of the mixture was increased to 180° C., and bromine was added dropwise in the reaction mixture at a rate of 48 parts per hour over 5 hours. Subsequently, chlorine was introduced in the reaction mixture at a rate of 30 parts per hour over 2 hours. The resultant reaction solution was slowly poured into 4000 parts of water and then, subjected to filtration and water-washing to obtain 193.5 parts of crude green pigment 3. The crude green pigment 3 thus obtained was found to consist only of crude halogenated aluminum phthalocyanine pigment, wherein the crude halogenated aluminum phthalocyanine pigment contained in its each molecule bromine atom and chlorine atom in average number of 13.5 and 2.5, respectively.

<Crude Green Pigment 4>

65 parts of copper phthalocyanine were dissolved in a fused salt mixture which was heated in advance to 130° C., the fused salt mixture comprising 429 parts of aluminum chloride and 96 parts of sodium chloride, thereby obtaining a mixture, which was then stirred for 2 hours while maintaining the aforementioned temperature. Then, the reaction temperature of the mixture was increased to 180° C., and bromine was added dropwise in the reaction mixture at a rate of 48 parts per hour over 5 hours. Subsequently, chlorine was introduced in the reaction mixture at a rate of 30 parts per hour over 2 hours. The resultant reaction solution was slowly poured into 4000 parts of water and then, subjected to filtration and water-washing to obtain 193.5 parts of crude green pigment 4. The crude green pigment 4 thus obtained was found to consist of 97% of crude halogenated copper phthalocyanine pigment and 3% of crude halogenated aluminum phthalocyanine pigment, wherein the crude halogenated copper phthalocyanine pigment contained in its each molecule bromine atom and chlorine atom in average number of 13.5 and 2.5, respectively, whereas the crude halogenated aluminum phthalocyanine pigment contained in its each molecule bromine atom and chlorine atom in average number of 13.5 and 2.5, respectively.

<Crude Green Pigment 5>

225 parts of biphenyl, 45 parts of naphthalene, 128 parts of phthalodinitrile, 48 parts of titanium tetrachloride and 2 parts of pyridine were mixed together, and heated to a temperature of 200° C. to allow a reaction to take place, which was followed by the filtration, drying and pulverization to obtain crude titanium phthalocyanine. Then, 200 parts of aluminum chloride and 40 parts of sodium chloride were heated to 120° C. to obtain an eutectic salt, and 40 parts of crude titanium phthalocyanine was added to the eutectic salt to obtain a mixture, which was then stirred for 30 minutes. Then, the reaction temperature of mixture was increased to 180° C., and bromine was added dropwise in the reaction mixture at a rate of 30 parts per hour over 5 hours. Subsequently, chlorine was introduced in the reaction mixture at a rate of 20 parts per hour over 2 hours. The resultant reaction solution was slowly poured into 2500 parts of water and then, subjected to filtration and water-washing to obtain a crude green pigment 5. The crude green pigment 5 thus obtained was found to consist of 58.0% of crude halogenated titanium phthalocyanine pigment and 42.0% of crude halogenated aluminum phthalocyanine pigment, wherein the crude halogenated titanium phthalocyanine pigment contained in its each molecule bromine atom and chlorine atom in average number of 13.5 and 2.5, respectively, whereas the crude halogenated aluminum phthalocyanine pigment contained in its each molecule bromine atom and chlorine atom in average number of 13.5 and 2.5, respectively.

<Crude Green Pigment 6>

20 parts of copper phthalocyanine were dissolved in a fused salt mixture which was heated in advance to 150° C., the fused salt mixture comprising 80 parts of aluminum chloride, 10 parts of sodium chloride and 10 parts of sodium sulfate, thereby obtaining a mixture. Then, the reaction temperature of the mixture was increased to 160° C., and bromine was added dropwise in the reaction mixture at a rate of 7.4 parts per hour over 6 hours. Subsequently, the resultant reaction mixture was heated up to 180° C., and then, chlorine was introduced in the reaction mixture at a rate of 4 parts per hour over 5 hours. The resultant reaction solution was slowly poured into 1000 parts of water and then, subjected to filtration and water-washing to obtain 45.4 parts of crude green pigment 6. The crude green pigment 6 thus obtained was found to consist of 99.9% of crude halogenated copper phthalocyanine pigment and 0.1% of crude halogenated aluminum phthalocyanine pigment, wherein the crude halogenated copper phthalocyanine pigment contained in its each molecule bromine atom and chlorine atom in average number of 13.5 and 2.5, respectively, whereas the crude halogenated aluminum phthalocyanine pigment contained in its each molecule bromine atom and chlorine atom in average number of 13.5 and 2.5, respectively.

Then, the crude green pigments were subjected to a pigmentization processing according to the following methods to manufacture green pigments.

<Green Pigment 1>

500 parts of the crude green pigment 4, 500 parts of sodium chloride and 250 parts of diethylene glycol were charged in a 1-gallon stainless steel kneader (Inoue Manufacturing Co., Ltd.) and were kneaded for 4 hours at a temperature of 120° C. Then, this kneaded mixture was cast in 5 L of hot water and heated at a temperature of 70° C. for one hour with stirring to obtain a slurry product, which was repeatedly subjected to filtration and water-washing to remove sodium chloride and diethylene glycol. The resultant product thus obtained was dried a whole day and night at a temperature of 80° C. to obtain 490 parts of green pigment 1. By the way, the green pigment 1 was found to consist of 97% of halogenated copper phthalocyanine pigment and 3% of halogenated aluminum phthalocyanine pigment.

<Green Pigment 2>

345 parts of the crude green pigment 4, 155 parts of the crude green pigment 1, 500 parts of sodium chloride and 250 parts of diethylene glycol were charged in a 1-gallon stainless steel kneader (Inoue Manufacturing Co., Ltd.) and were kneaded for 4 hours at a temperature of 120° C. Then, this kneaded mixture was cast in 5 L of hot water and heated at a temperature of 70° C. for one hour with stirring to obtain a slurry product, which was repeatedly subjected to filtration and water-washing to remove sodium chloride and diethylene glycol. The resultant product thus obtained was dried a whole day and night at a temperature of 80° C. to obtain 490 parts of green pigment 2. By the way, the green pigment 2 was found to consist of 95% of halogenated copper phthalocyanine pigment and 5% of halogenated aluminum phthalocyanine pigment.

<Green Pigment 3>

500 parts of the crude green pigment 1, 500 parts of sodium chloride and 250 parts of diethylene glycol were charged in a 1-gallon stainless steel kneader and were subjected to the same procedures as those of the green pigment 1, thereby obtaining 490 parts of green pigment 3. By the way, the green pigment 3 was found to consist of 90.5% of halogenated copper phthalocyanine pigment and 9.5% of halogenated aluminum phthalocyanine pigment.

<Green Pigment 4>

282 parts of the crude green pigment 4, 218 parts of the crude green pigment 2, 500 parts of sodium chloride and 250 parts of diethylene glycol were charged in a 1-gallon stainless steel kneader and were subjected to the same procedures as those of the green pigment 1, thereby obtaining 490 parts of green pigment 4. By the way, the green pigment 4 was found to consist of 79.0% of halogenated copper phthalocyanine pigment and 21.0% of halogenated aluminum phthalocyanine pigment.

<Green Pigment 5>

154 parts of the crude green pigment 4, 346 parts of the crude green pigment 2, 500 parts of sodium chloride and 250 parts of diethylene glycol were charged in a 1-gallon stainless steel kneader and were subjected to the same procedures as those of the green pigment 1, thereby obtaining 490 parts of green pigment 5. By the way, the green pigment 5 was found to consist of 70.0% of halogenated copper phthalocyanine pigment and 30.0% of halogenated aluminum phthalocyanine pigment.

<Green Pigment 6>

500 parts of the crude green pigment 2, 500 parts of sodium chloride and 250 parts of diethylene glycol were charged in a 1-gallon stainless steel kneader and were subjected to the same procedures as those of the green pigment 1, thereby obtaining 490 parts of green pigment 6. By the way, the green pigment 6 was found to consist of 58.0% of halogenated copper phthalocyanine pigment and 42.0% of halogenated aluminum phthalocyanine pigment.

<Green Pigment 7>

410 parts of the crude green pigment 4, 90 parts of the crude green pigment 5, 500 parts of sodium chloride and 250 parts of diethylene glycol were charged in a 1-gallon stainless steel kneader and were subjected to the same procedures as those of the green pigment 1, thereby obtaining 490 parts of green pigment 7. By the way, the green pigment 7 was found to consist of 79.5% of halogenated copper phthalocyanine pigment, 10.0% of halogenated aluminum phthalocyanine pigment and 10.5% of halogenated titanium phthalocyanine pigment.

<Green Pigment 8>

500 parts of the crude green pigment 6, 500 parts of sodium chloride and 250 parts of diethylene glycol were charged in a 1-gallon stainless steel kneader and were subjected to the same procedures as those of the green pigment 1, thereby obtaining 490 parts of green pigment 8. By the way, the green pigment 8 was found to consist of 99.9% of halogenated copper phthalocyanine pigment and 0.1% of halogenated aluminum phthalocyanine pigment.

<Green Pigment 9>

450 parts of the crude green pigment 3, 50 parts of the crude green pigment 6, 500 parts of sodium chloride and 250 parts of diethylene glycol were charged in a 1-gallon stainless steel kneader and were subjected to the same procedures as those of the green pigment 1, thereby obtaining 490 parts of green pigment 9. By the way, the green pigment 9 was found to consist of 9.9% of halogenated copper phthalocyanine pigment and 90.1% of halogenated aluminum phthalocyanine pigment.

Then, by making use of these green pigments, green photosensitive colored compositions (resist materials) were manufactured, wherein the mixing ratio between the halogenated copper phthalocyanine pigment and the second halogenated metallophthalocyanine pigment was altered.

EXAMPLE 1

A mixture having the following composition was stirred to form a uniform dispersion, which was filtered using a 1 $\mu$m filter to prepare an alkali development type photosensitive colored composition.

| | |
|---|---|
| Green pigment 1 | 4.5 parts |
| Acrylic resin solution | 24.0 parts |
| Trimethylol propane triacrylate ("NK ester ATMPT", Shin-Nakamura Chemical Co., Ltd.) | 5.4 parts |
| Photo-initiator ("Irgacure 907", Ciba-Geigy Co., Ltd.) | 0.3 part |
| Sensitizer ("EAB-F", Hodogaya Chemical Co., Ltd.) | 0.2 part |
| Cyclohexanone | 65.1 parts |

EXAMPLES 2 TO 7

Alkali development type photosensitive colored compositions were prepared in the same manner as that set forth in Example 1 except that the green pigments 2 to 7 were respectively substituted for the green pigment 1.

COMPARATIVE EXAMPLE 1

An alkali development type photosensitive colored composition was prepared in the same manner as that set forth in Example 1 except that the green pigment 8 was substituted for the green pigment 1.

COMPARATIVE EXAMPLE 2

An alkali development type photosensitive colored composition was prepared in the same manner as that set forth in Example 1 except that the green pigment 9 was substituted for the green pigment 1.

The photosensitive colored compositions obtained in Examples 1 to 7, and Comparative Examples 1 and 2 were respectively coated on the surface of glass substrate 100 mm×100 mm and 1.1 mm in thickness by making use of a spin coater at a revolving speed of 500 rpm, 1000 rpm, 1500 rpm or 2000 rpm to thereby obtain four kinds of coated substrate, each differing in film thickness. Then, after being dried at a temperature of 70° C. for 20 minutes, the coated film was exposed to ultraviolet ray at an integrated quantity of light of 150 mJ by means of ultra-high pressure mercury lamp. Thereafter, the coated substrate was heated for one hour at a temperature of 230° C., and, after being allowed to cool, the chromaticity (Y, x, y) of the resultant green coated film where the C-light source was employed was measured by means of microspectrophotometer ("OSP-SP100"; Olympus Kogaku Co., Ltd.). Based on the results obtained through the measurements on the chromaticity-spectrometry of four groups of sample, the maximum transmittance (Tmax), x and y at the moment when the minimum value of spectral transmittance of the wavelength ranging from 400 to 700 nm became 1% were determined. Further, the features of surface of the substrate where the coating was performed at a revolving speed of 1000 rpm was observed by means of an optical microscope ("BX60"; Olympus Kogaku Co., Ltd.). The results thus obtained are shown in Table 1.

TABLE 1

| Colored composition | Y | x | y | Tmax | Tmin | Surface State |
|---|---|---|---|---|---|---|
| Example 1 | 64.21 | 0.2526 | 0.4679 | 90.7% | 1.0% | ∘* |
| Example 2 | 65.32 | 0.2541 | 0.4563 | 91.3% | 1.0% | ∘ |
| Example 3 | 66.75 | 0.2572 | 0.4433 | 91.8% | 1.0% | ∘ |
| Example 4 | 67.75 | 0.2626 | 0.4444 | 92.2% | 1.0% | ∘ |
| Example 5 | 69.12 | 0.2665 | 0.4416 | 92.2% | 1.0% | ∘ |
| Example 6 | 70.38 | 0.2714 | 0.4427 | 92.4% | 1.0% | ∘ |
| Example 7 | 66.82 | 0.2584 | 0.4434 | 91.8% | 1.0% | ∘ |
| Comp Ex. 1 | 62.53 | 0.2501 | 0.4797 | 90.5% | 1.0% | ∘ |
| Comp Ex. 2 | 67.22 | 0.3169 | 0.4175 | 77.2% | 1.0% | ∘ |

*The mark "∘" indicates that the surface state was excellent.

As shown in Table 1, all of the green coated films which were obtained by making use of the colored composition of the present invention were found as having an increased brightness "Y" under the conditions where the chromaticity "x" thereof was within the range of 0.25 to 0.34, and the chromaticity "y" thereof was within the range of 0.43 to 0.58. It will be also seen from Table 1 that the brightness of the green coated films according to the present invention was enhanced as the content of halogenated aluminum phthalocyanine pigment was increased as far as the content of halogenated aluminum phthalocyanine pigment was limited within the range of not more than 80 mol %. Whereas, the green coated film of Comparative Example 1 where the content of halogenated aluminum phthalocyanine pigment was 0.1%, i.e. smaller than the range defined by the present invention was found lower in brightness. Further, the green coated film of Comparative Example 2 where the content of halogenated aluminum phthalocyanine pigment was 90%, i.e. larger than the range defined by the present invention, was found insufficient in concentration of color in greenness in view of a relatively small "y" value of 0.4175, thereby making it unsuitable for use as a green filter segment, even though the brightness "Y" thereof was as large as 67.

Next, for the adjustment of color tone, a green pigment and a yellow pigment (C.I. Pigment Yellow 150) were combined to prepare a green photosensitive colored composition (resist material).

EXAMPLE 8

A mixture having the following composition was stirred to form a uniform dispersion, which was filtered using a 1 μm filter to prepare an alkali development type photosensitive colored composition.

| | |
|---|---|
| Green pigment 1 | 3.6 parts |
| Yellow pigment (PY150) | 0.9 parts |
| Acrylic resin solution | 24.0 parts |
| Trimethylol propane triacrylate ("NK ester ATMPT", Shin-Nakamura Chemical Co., Ltd.) | 5.4 parts |
| Photo-initiator ("Irgacure 907", Ciba-Geigy Co., Ltd.) | 0.3 part |
| Sensitizer ("EAB-F", Hodogaya Chemical Co., Ltd.) | 0.2 part |
| Cyclohexanone | 65.1 parts |

EXAMPLES 9 TO 13

Alkali development type photosensitive colored compositions were prepared in the same manner as that set forth in Example 8 except that the kind of green pigment as well as the mixing ratio (weight ratio) between the green pigment and the yellow pigment were altered as described in the following Table 2.

The photosensitive colored compositions obtained in Examples 8 to 13 were respectively coated on the surface of glass substrate 100 mm×100 mm and 1.1 mm in thickness by making use of a spin coater so as to obtain a film thickness exhibiting x=0.3172, and y=0.4703. Then, after being dried at a temperature of 70° C. for 20 minutes, the coated film was exposed to ultraviolet ray at an integrated quantity of light of 150 mJ by means of ultra-high pressure mercury lamp. Thereafter, the coated substrate was heated for one hour at a temperature of 230° C., and, after being allowed to cool, the brightness (Y), maximum transmittance (Tmax), minimum transmittance (Tmin) and contrast of the resultant green coated film where the D65-light source was employed were measured by means of microspectrophotometer ("OSP SP100"; Olympus Kogaku Co., Ltd.). Further, the features of surface of the substrate was observed by means of an optical microscope ("BX60"; Olympus Kogaku Co., Ltd.). The results thus obtained are shown in Table 2.

TABLE 2

| Colored composition | Green Pigment | Green pigment/ Yellow pigment | Y | Tmax | Tmin | Contrast | Surface state |
| --- | --- | --- | --- | --- | --- | --- | --- |
| Example 8 | Pigment 1 | 75/25 | 79.03 | 94.37% | 15.60% | 1880 | o* |
| Example 9 | Pigment 2 | 76/24 | 79.34 | 94.28% | 15.32% | 1920 | o |
| Example 10 | Pigment 3 | 78/22 | 79.95 | 94.66% | 15.02% | 1970 | o |
| Example 11 | Pigment 4 | 82/18 | 80.34 | 94.44% | 14.66% | 2010 | o |
| Example 12 | Pigment 5 | 85/15 | 80.76 | 94.43% | 13.45% | 2050 | o |
| Example 13 | Pigment 6 | 87/13 | 80.54 | 94.40% | 11.44% | 2110 | o |

*The mark "o" indicates that the surface state was excellent.

As shown in Table 2, all of the green coated films which were obtained by making use of the colored composition of the present invention were found as having an increased brightness as the content of halogenated aluminum phthalocyanine pigment was increased even if the "x" and "y" (hue) thereof was adjusted by making use of the yellow pigment. It will be also seen from Table 2 that as far as the content of halogenated aluminum phthalocyanine pigment was limited within the range of not more than 80 mol %, the content of the yellow pigment to be employed for the adjustment of color tone could be reduced as the content of halogenated aluminum phthalocyanine pigment was increased, and at the same time, the contrast of tone was enabled to enhance as the content of halogenated aluminum phthalocyanine pigment was increased.

Next, in the same manner as in the case of the aforementioned green photosensitive colored compositions, a blue photosensitive colored composition and a red photosensitive colored composition were prepared. Then, by making use of these two kinds of colored compositions and the green photosensitive colored compositions which were obtained in Examples 1 to 13, color filters was manufactured according to the following method.

| <Blue photosensitive colored composition> | |
| --- | --- |
| Blue pigment: C.I. Pigment Blue 15: 6 ("Lionol Blue ES", Toyo Ink Mfg. Co., Ltd.) | 4.5 parts |
| Acrylic resin solution | 24.0 parts |
| Trimethylolpropane triacrylate ("NK ester ATMPT", Shin-Nakamura Chemical Co., Ltd.) | 5.4 parts |
| Photo-initiator ("Irgacure 907", Ciba-Geigy Co., Ltd.) | 0.3 part |
| Sensitizer ("EAB-F", Hodogaya Chemical Co., Ltd.) | 0.2 part |
| Cyclohexanone | 65.1 parts |
| <Red photosensitive colored composition> | |
| Red pigment: C.I. Pigment Red 254 ("Irga for Red B-CF", Ciba-Geigy Co., Ltd.) | 4.0 parts |
| Red pigment (C.I. Pigment Red 177) ("Chromophthal Red A2B", Ciba-Geigy Co., Ltd.) | 0.5 parts |
| Acrylic resin solution | 24.0 parts |
| Trimethylol propane triacrylate ("NK ester ATMPT", Shin-Nakamura Chemical Co., Ltd.) | 5.4 parts |
| Photo-initiator ("Irgacure 907", Ciba-Geigy Co., Ltd.) | 0.3 part |
| Sensitizer ("EAB-F", Hodogaya Chemical Co., Ltd.) | 0.2 part |
| Cyclohexanone | 65.1 parts |

Each of these photosensitive colored compositions was coated on the surface of a glass substrate by making use of a spin coater, and then dried at a temperature of 70° C. by making use of a hot air oven for 20 minutes. Then, the coated layer was exposed to ultraviolet ray through a photomask having a stripe-like openings each having a width of 100 μm. Thereafter, the unexposed portion was washed away by making use of a 5% aqueous solution of sodium carbonate, after which the residual layer was baked at a temperature of 230° C. for 30 minutes by using a hot air oven to obtain a color filter which was provided with a red filter segment, a blue filter segment and a green filter segment, each segment having a stripe pattern 100 μm in line width.

The color filters thus prepared were all excellent in brightness of white color.

Since the colored composition according to the present invention comprises a halogenated copper phthalocyanine pigment and a second halogenated metallophthalocyanine pigment at a specific mixing ratio, the transmitting wavelength region of the colored composition is enabled to shift toward a longer wavelength side, thereby making it possible to form a green filter segment which is extremely high in brightness.

Since the color filter provided with a green filter segment that can be formed by using the colored composition according to the present invention is capable of providing a color liquid crystal display device with not only a high brightness but also a high chromaticity, the color filter would be suited for use as a color separating color filter for a transmissive/reflective type color liquid display device as well as for a solid state image sensor.

What is claimed is:

1. A colored composition for color filter, which comprises:
   a colorant carrier comprising a transparent resin, a precursor of a transparent resin or a mixture thereof; and
   a green colorant dispersed in said colorant carrier and consisting of a first halogenated metallophthalocyanine pigment having copper as a central metal, and at least one second halogenated metallophthalocyanine pigment having, as a central metal, a metal selected from the group consisting of Mg, Al, Si, Ti, V, Mn, Fe, Co, Ni, Zn, Ge and Sn;
   wherein a content of said second halogenated metallophthalocyanine pigment is within a range of 1 to 80 mol % based on a total amount of said green colorant.

2. The composition according to claim 1, wherein said first halogenated metallophthalocyanine pigment contains 8 to 16 bromine atoms per molecule.

3. The composition according to claim 1, wherein said second halogenated metallophthalocyanine pigment contains 8 to 16 bromine atoms per molecule thereof.

4. The composition according to claim 2, wherein said second halogenated metallophthalocyanine pigment contains 8 to 16 bromine atoms per molecule thereof.

5. The composition according to claim 1, which contains said green colorant in an amount sufficient to provide 5% by weight to 39% by weight of said green colorant in a final color filter.

6. The composition according to claim 1, which further comprises a yellow pigment.

7. The composition according to claim 6, which contains said green colorant and said yellow pigment in an amount sufficient to provide 10 to 55% by weight of said green colorant and said yellow pigment in a final color filter.

8. A color filter comprising at least one red filter segment, at least one blue filter segment, and at least one green filter segment, wherein said at least one green filter segment is prepared from a colored composition as claimed in claim 1.

* * * * *